United States Patent
Pruet

(10) Patent No.: US 7,276,105 B2
(45) Date of Patent: Oct. 2, 2007

(54) SEPARATION OF WATER FROM FISCHER-TROPSCH PRODUCT

(75) Inventor: Randall B. Pruet, Rumbai (ID)

(73) Assignee: Chevron U.S.A. Inc., San Ramon, CA (US)

( * ) Notice: Subject to any disclaimer, the term of this patent is extended or adjusted under 35 U.S.C. 154(b) by 397 days.

(21) Appl. No.: 10/880,336

(22) Filed: Jun. 28, 2004

(65) Prior Publication Data

US 2005/0284290 A1    Dec. 29, 2005

(51) Int. Cl.
*B01D 53/22* (2006.01)
(52) U.S. Cl. .............. 95/52; 95/45; 518/700; 585/800; 585/818; 210/640
(58) Field of Classification Search .............. 95/45, 95/52; 518/700, 705, 728; 585/800, 802, 585/818; 210/635, 688, 640, 650
See application file for complete search history.

(56) References Cited

U.S. PATENT DOCUMENTS

| | | | |
|---|---|---|---|
| 3,536,611 A | 10/1970 | De Filippi et al. | |
| 3,966,633 A | 6/1976 | Friedman | |
| 4,568,663 A | 2/1986 | Mauldin | |
| 4,781,831 A | 11/1988 | Goldsmith | |
| 4,983,423 A | 1/1991 | Goldsmith | |
| 5,009,781 A | 4/1991 | Goldsmith | |
| 5,106,502 A | 4/1992 | Goldsmith | |
| 5,108,601 A | 4/1992 | Goldsmith | |
| 5,120,576 A | 6/1992 | Goldsmith | |
| 5,145,363 A * | 9/1992 | Nielsen et al. | ............. 432/180 |
| 5,525,143 A | 6/1996 | Morgan et al. | |
| 5,942,119 A | 8/1999 | Deckman et al. | |
| 6,126,833 A | 10/2000 | Stobbe et al. | |
| 6,225,358 B1 | 5/2001 | Kennedy | |
| 6,403,660 B1 * | 6/2002 | Espinoza et al. | ........... 518/700 |
| 6,533,945 B2 | 3/2003 | Shah | |
| 6,872,753 B2 * | 3/2005 | Landis et al. | ............... 518/700 |
| 2002/0006969 A1 | 1/2002 | O'Beck et al. | |

FOREIGN PATENT DOCUMENTS

| | | |
|---|---|---|
| EP | 0609079 A1 | 8/1994 |
| EP | 0880487 B1 | 9/2001 |
| EP | 1 524 254 | 4/2005 |
| GB | 2 391 225 | 2/2004 |
| GB | 2 391 225 A * | 2/2004 |
| WO | 2004/002927 | 1/2004 |
| WO | WO 2004/002927 A1 * | 1/2004 |

OTHER PUBLICATIONS

U.S. Appl. No. 10/879,474, "Treatment of Reaction Water from Fischer-Tropsch Reactor", filed Jun. 28, 2004, inventor Randall B. Pruet.
"Applications of ceramic-membrane technology", *Fundamentals of Gas to Liquid*, Petroleum Economist, pp. 24-26, 2003.
Hazardous Waste Disposal by Thermal Oxidation, John Zink Company 2001.
Thermal Oxidizers, Callidus Technologies, Inc., product brochure.
Netherlands Search Report dated Oct. 28, 2005.

* cited by examiner

*Primary Examiner*—Jason M. Greene
(74) *Attorney, Agent, or Firm*—E. Joseph Gess

(57) ABSTRACT

A method for separating water from a Fischer-Tropsch reactor product stream in a cost effective and energy efficient manner which comprises feeding a Fischer-Tropsch product stream to a separation membrane, preferably a ceramic membrane, and recovering water vapor from the downstream permeate side of the membrane.

7 Claims, 2 Drawing Sheets

SEPARATION OF WATER FROM FISCHER-TROPSCH PRODUCT

BACKGROUND OF THE INVENTION

1. Field of the Invention

The present invention relates to a cost effective Fischer-Tropsch process. More specifically, the present invention relates to a Fischer-Tropsch process in which water from a Fischer-Tropsch reactor is separated in a cost effective and energy efficient manner using a separation membrane.

2. Description of the Related Art

Prior approaches degas, de-oil, and/or distill Fischer-Tropsch reaction water to partially remove dissolved and entrained contaminants. However, the resulting reaction water still contains lower molecular weight hydrocarbons and oxygenates. As oxygenates are known to cause corrosion, while hydrocarbons may cause foaming, the resulting water product is of little or no commercial value and requires further treatment before recovery or preparation for disposal.

Thus, the water product is usually treated in expensive facilities in order to remove the contaminants. Typical treatment steps include alcohol stripping, anaerobic digestion, and biological oxidation. Such treatment steps serve to remove contaminants from the water product. Bio-treatment is costly, sensitive to operate, and generates solid wastes. Simple pH neutralization followed by offshore disposal requires regulatory variances, does not result in the recovery of any water, and requires large amounts of neutralization chemicals.

Methods for treating hydrocarbon synthesis wastewater are described in U.S. Pat. No. 3,966,633 and U.S. patent application 2002/0006969. Further, U.S. Pat. No. 6,225,358 discloses a method for producing heavier hydrocarbons from lighter hydrocarbons including converting synthesis gas into heavier hydrocarbons and removing contaminants from an aqueous byproduct stream. Contaminants are removed from the aqueous byproduct stream by concentrating the contaminants in a concentrator column and using the light hydrocarbons in a stripper column to remove the contaminants from the byproduct stream.

U.S. Pat. No. 6,533,945 provides a process wherein the wastewater of a hydrocarbon synthesis reactor, such as a Fischer-Tropsch reactor, is sent to a gasifier and subsequently reacted with steam and oxygen at high temperatures and pressures so as to produce synthesis gas.

The use of membranes is also well known and documented in the literature, including, by way of example, U.S. Pat. No. 5,525,143, which discloses a method and apparatus for the dehydration of gases utilizing hollow fiber membranes. An internal sweep of the permeate side of the membranes utilizes an aperture in the tubesheet at the product end of the module thereby sweeping the permeate side of the membrane with product gas. U.S. Pat. No. 5,942,119 discloses that the presence of hydrogen in the feed stream, permeate stream, or feed stream when present, either alone or in combination, causes a reduction in flux decay through molecular sieve membranes. U.S. Pat. No. 6,403,660 discloses a process for producing hydrocarbons involving allowing reactants forming part of a reaction medium in a reaction zone, to react at reaction conditions so as to form primary hydrocarbon products. By-product water, formed under the reaction conditions, is allowed to permeate through a porous membrane, thereby to be separated from the reaction medium. The separation is conducted in the reactor to separate the water from the catalyst. The water formed has an unfavorable or negative effect on the catalyst, e.g., a Fischer-Tropsch catalyst.

Ceramic membrane technology is well known and documented in the literature, including, by way of example, U.S. Pat. Nos. 4,781,831, 4,983,423, 5,009,781, 5,106,502, 5,108,601, 5,120,576, and 6,126,833.

"Applications of ceramic-membrane technology," *Fundamentals of Gas to Liquids*, Petroleum Economist 2003, discloses the development of two technologies based on the applications of oxygen ion transport membranes. One of the technologies aims to combine the autothermal reformer and cryogenic air separation unit (ASU) into a single reactor and the other technology aims to replace the cryogenic technology in the ASU. The membranes are dense ceramic materials made from mixed metal oxides, and at high temperatures (over 700° C.), have both electronic and ionic conductivity, and are extremely selective and very fast in transporting oxygen.

Thermal oxidation, which converts harmful components to less polluting compounds, such as water vapor, carbon dioxide, and nitrogen oxides, offers the most widely proven solution to pollution from refinery, petrochemical, fine chemical, pharmaceutical, and other process industries. The use of thermal oxidizers to dispose of a wide variety of hazardous industrial wastes, especially tail gases containing a variety of sulfur compounds, is known. Descriptions of pollutant control processes can be found in Hazardous Waste Disposal by Thermal Oxidation, John Zink Company, 2001 and Thermal Oxidizers, Callidus Technologies, Inc.

It would be economically advantageous to be able to separate water from a Fischer-Tropsch overhead product without expensive condensation and vaporization equipment. It would be highly desirable to provide such a process while involving some of the useful technological advances to help simplify the overall process.

SUMMARY OF THE INVENTION

The present invention provides a process for the separation of water from a Fischer-Tropsch product stream taken from a reactor comprising the use of membrane technology. In one embodiment, a method for separating water, generally in vapor form, from a Fischer-Tropsch product stream comprises feeding the Fischer-Tropsch product stream to a membrane, preferably a ceramic membrane, comprising an upstream retentate side and a downstream permeate side. A gas reduced in water content is recovered from the retentate side of the ceramic membrane, and passed on for further treatment/separation. Water vapor is recovered from the downstream permeate side of the ceramic membrane. In a preferred embodiment, a hydrogen-rich sweep gas is fed to the downstream permeate side of the separation membrane to thereby recover/remove the water, generally a vapor, from the membrane. The recovered water can then be used as is or forwarded for purification, e.g., preferably to a thermal oxidizer. The use of a thermal oxidizer is preferred to insure removal of all contaminants from the reaction water.

In another embodiment, a method for separating water vapor from a Fischer-Tropsch overhead product stream comprises feeding the Fischer-Tropsch overhead product to a ceramic membrane comprising an upstream retentate side and a downstream permeate side. A hydrogen-rich sweep gas is fed to the downstream permeate side of the ceramic membrane. A gas reduced in water content is recovered from the upstream retentate side of the ceramic membrane. The gas reduced in water content is fed to a condenser and a separation unit. Water vapor is recovered from the downstream permeate side of the ceramic membrane and fed to a thermal oxidizer.

Among other factors, the present invention is based upon the discovery that the use of separation membranes to remove water vapor from a product stream of a Fischer-Tropsch reactor, e.g., an overhead stream, provides a successful, yet cost effective and energy efficient method for recovering products and separating water, as vaporization equipment can be eliminated and equipment size and condenser requirements may be reduced. The result is an overall cost effective and energy efficient Fischer-Tropsch process, which also allows the useful recovery of water from the product streams.

DETAILED DESCRIPTION OF THE INVENTION

Figure 1:
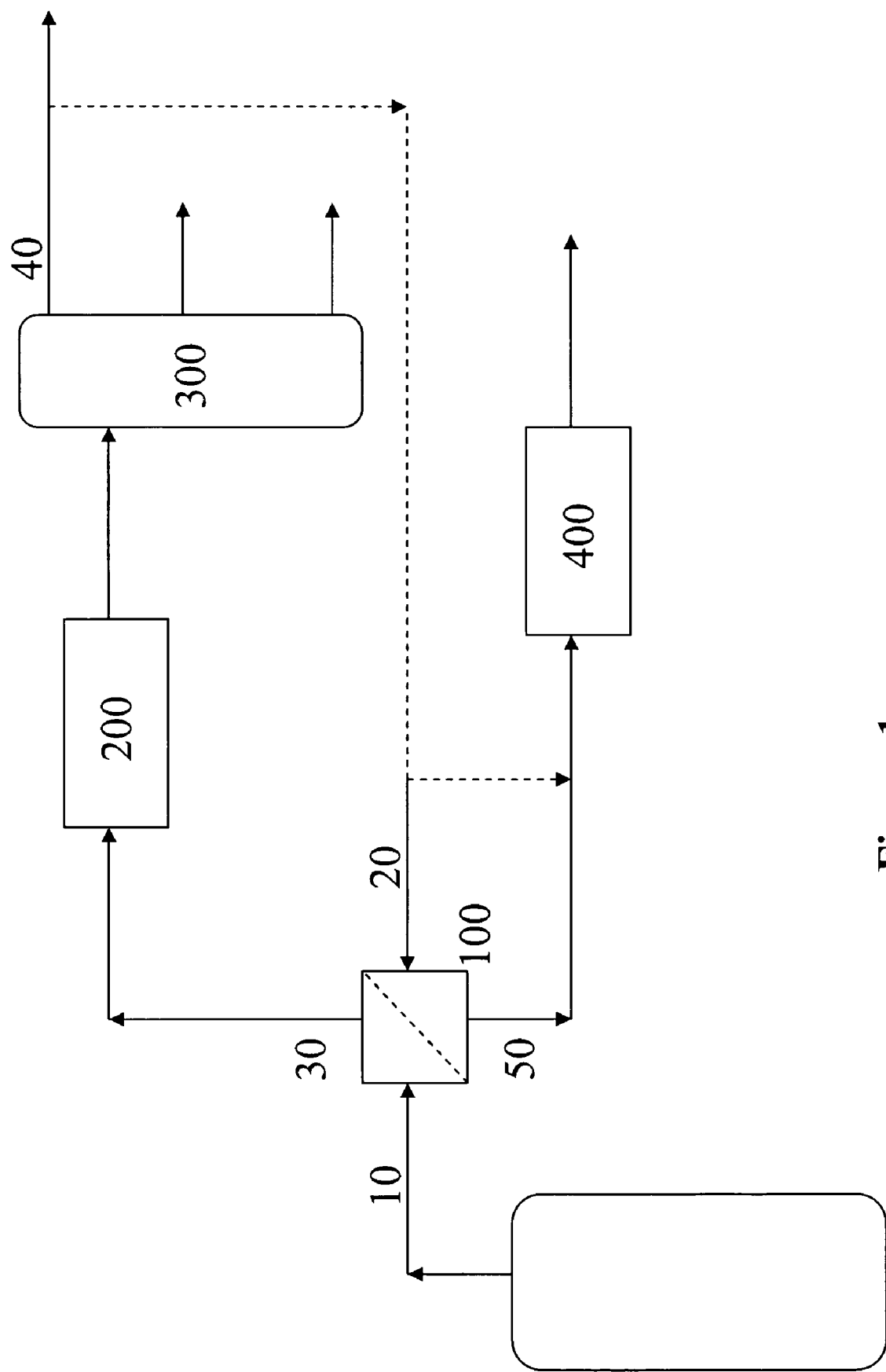
FIG. 1 illustrates an embodiment of the present invention comprising a thermal oxidizer.

The present invention provides methods for the separation of water from Fischer-Tropsch product streams while realizing increased energy and cost efficiencies. Generally, the present methods permit a reduction in equipment size, while the integrated methods provide further energy and cost efficiencies. Integrated, as used herein, means that while some of the steps of the methods may be parallel to other steps of the method certain steps of the method are interrelated or somehow dependent upon either earlier or later steps of the total method.

In Fischer-Tropsch chemistry, synthesis gas (syngas) is converted to liquid hydrocarbons by contact with a Fischer-Tropsch catalyst under reactive conditions. Typically, methane and optionally heavier hydrocarbons (ethane and heavier) can be sent through a conventional syngas generator to provide syngas. Generally, syngas contains hydrogen and carbon monoxide, and may include minor amounts of carbon dioxide and/or water. The presence of sulfur, nitrogen, halogen, selenium, phosphorus and arsenic contaminants in the syngas is undesirable. For this reason and depending on the quality of the syngas, it is preferred to remove sulfur and other contaminants from the feed before performing the Fischer-Tropsch chemistry. Means for removing these contaminants are well known to those of skill in the art. For example, ZnO guardbeds are preferred for removing sulfur impurities. Means for removing other contaminants are well known to those of skill in the art. It also may be desirable to purify the syngas prior to the Fischer-Tropsch reactor to remove carbon dioxide produced during the syngas reaction and any additional sulfur compounds not already removed. This can be accomplished, for example, by contacting the syngas with a mildly alkaline solution (e.g., aqueous potassium carbonate) in a packed column.

In the Fischer-Tropsch process, contacting a synthesis gas comprising a mixture of $H_2$ and CO with a Fischer-Tropsch catalyst under suitable temperature and pressure reactive conditions forms liquid and gaseous hydrocarbons. The Fischer-Tropsch reaction is typically conducted at temperatures of about 300-700° F. (149-371° C.), preferably about 400-550° F. (204-228° C.); pressures of about 10-600 psia, (0.7-41 bars), preferably about 30-300 psia, (2-21 bars); and catalyst space velocities of about 100-10,000 cc/g/hr, preferably about 300-3,000 cc/g/hr. Examples of conditions for performing Fischer-Tropsch type reactions are well known to those of skill in the art.

The reaction can be conducted in a variety of reactor types, such as fixed bed reactors containing one or more catalyst beds, slurry reactors, fluidized bed reactors, or a combination of different type reactors. Such reaction processes and reactors are well known and documented in the literature.

The slurry Fischer-Tropsch process utilizes superior heat (and mass) transfer characteristics for the strongly exothermic synthesis reaction and is able to produce relatively high molecular weight, paraffinic hydrocarbons when using a cobalt catalyst. In the slurry process, a syngas comprising a mixture of hydrogen and carbon monoxide is bubbled up as a third phase through a slurry which comprises a particulate Fischer-Tropsch type hydrocarbon synthesis catalyst dispersed and suspended in a slurry liquid comprising hydrocarbon products of the synthesis reaction which are liquid under the reaction conditions. The mole ratio of the hydrogen to the carbon monoxide may broadly range from about 0.5 to about 4, but is more typically within the range of from about 0.7 to about 2.75 and preferably from about 0.7 to about 2.5. A particularly preferred Fischer-Tropsch process is taught in EP0609079.

In general, Fischer-Tropsch catalysts contain a Group VIII transition metal on a metal oxide support. The catalysts may also contain a noble metal promoter(s) and/or crystalline molecular sieves. Suitable Fischer-Tropsch catalysts comprise one or more of Fe, Ni, Co, Ru and Re, with cobalt being preferred. A preferred Fischer-Tropsch catalyst comprises effective amounts of cobalt and one or more of Re, Ru, Pt, Fe, Ni, Th, Zr, Hf, U, Mg and La on a suitable inorganic support material, preferably one which comprises one or more refractory metal oxides. In general, the amount of cobalt present in the catalyst is between about 1 and about 50 weight percent of the total catalyst composition. The catalysts can also contain basic oxide promoters such as $ThO_2$, $La_2O_3$, MgO, and $TiO_2$, promoters such as $ZrO_2$, noble metals (Pt, Pd, Ru, Rh, Os, Ir), coinage metals (Cu, Ag, Au), and other transition metals such as Fe, Mn, Ni, and Re. Suitable support materials include alumina, silica, magnesia and titania or mixtures thereof. Preferred supports for cobalt containing catalysts comprise titania. Useful catalysts and their preparation are known and illustrated in U.S. Pat. No. 4,568,663, which is intended to be illustrative but non-limiting relative to catalyst selection.

Certain catalysts are known to provide chain growth probabilities that are relatively low to moderate, and the reaction products include a relatively high proportion of low molecular ($C_{2-8}$) weight olefins and a relatively low proportion of high molecular weight ($C_{30+}$) waxes. Certain other catalysts are known to provide relatively high chain growth probabilities, and the reaction products include a relatively low proportion of low molecular ($C_{2-8}$) weight olefins and a relatively high proportion of high molecular weight ($C_{30+}$) waxes. Such catalysts are well known to those of skill in the art and can be readily obtained and/or prepared.

The hydrocarbon products of the Fischer-Tropsch synthesis process may range from $C_{1-200+}$ with a majority in the $C_{5-100+}$ range. The products from a Fischer-Tropsch process contain predominantly paraffins. The products from Fischer-Tropsch reactions generally include a light reaction product and a waxy reaction product. The light reaction product (i.e., the condensate fraction) includes hydrocarbons boiling below about 700° F. (e.g., tail gases through middle distillate fuels), largely in the $C_{5-20}$ range, with decreasing amounts up to about $C_{30}$. The waxy reaction product (i.e., the wax fraction) includes hydrocarbons boiling above about 600° F. (e.g., vacuum gas oil through heavy paraffins), largely in the $C_{20+}$ range, with decreasing amounts down to $C_{10}$.

Both the light reaction product and the waxy product are substantially paraffinic. The waxy product generally comprises greater than 70 weight % normal paraffins, and often greater than 80 weight % normal paraffins. The light reaction product comprises paraffinic products with a significant proportion of alcohols and olefins. In some cases, the light reaction product may comprise as much as 50 weight %, and even higher, alcohols and olefins. It is the light reaction product (i.e., the overhead stream) that is preferably treated in the methods of the present invention since it contains most, if not all, of the reaction water created during the Fischer-Tropsch reaction. The reaction water generally contains light hydrocarbon and alcohols. The overhead stream is primarily vaporous in nature.

In general, the Fischer-Tropsch product stream, whether the overhead stream or some other product stream taken from the water, is passed to a separation membrane. Water, generally in the vaporous state, is transported across the membrane, and is removed as permeate from the downstream permeate side of the membrane. The retentate, which is the portion of the product stream other than the water, is recovered from the upstream retentate side of the separation membrane. The recovered stream is reduced in water content relative to the amount of water found in the product stream fed to the separation membrane. The retentate stream can then be sent to a condenser and three-way separator to separate out an $H_2$-rich tail gas, light hydrocarbons and any remaining water.

By using the separation membrane to separate reaction water from the other reaction products, often a very usable water product is recovered quickly, while the load on downstream condensers and separation units is greatly reduced. The condenser and three-way separator to which the retentate stream is passed can be much smaller than usual when the water is not removed in accordance with the present invention. Thus, the size and requirements of such condensers and separators may be reduced. As well, the separation of water can provide a usable product provided the separation effected by the membrane is sufficient. This can avoid the need for complicated vaporization systems generally used to achieve a relatively pure water product. If additional separation is needed, the separation can usually be achieved using typical distillation apparatus.

In another embodiment, the recovered water is forwarded to a thermal oxidizer, the use of which has been found to be effective in providing a pure water product. In the thermal oxidizer, the water is reacted and contaminants are oxidized to water vapor, carbon dioxide and nitrogen.

Thermal oxidizers as disclosed by the present invention are commercially available from such companies as CB&I Callidus, Hamworthy Combustion Engineering Ltd., and John Zink Company, LLC. Meeting CO and unburned hydrocarbon emission regulations from thermal oxidizers is accomplished by the correct selection of thermal oxidizer resident time, operating temperature, and turbulence; CO and hydrocarbon destruction efficiency increase as residence time and operating temperature increase. Operating conditions for thermal oxidizers vary according to emission regulations and the waste stream being converted. Operating conditions may vary over a wide range such as 20-100 MM BTU/hr burner, 60,000-135,000 lbs/hr flow, 850-40,000 kg/hr waste flow, 0.6-2 second residence time, 550-2200° F. operating temperature, and destruction efficiencies of up to 99.9999%.

As part of the integrated Fischer-Tropsch process of the present invention, in a preferred embodiment $H_2$-rich gas is used to sweep the permeate side of the separation membrane. The $H_2$ gas sweep will entrain and recover the water permeate, and help drive the separation process. Furthermore, use of the $H_2$-rich sweep gas will also be beneficial when the water is sent to a thermal oxidizer. The $H_2$-rich gas can then be used as fuel for the thermal oxidizer, reducing the amount of additional fuel needed to operate the thermal oxidizer. Preferably, the $H_2$-rich gas is tail gas which is obtained/recovered from the three-way separator, and then used as the sweep gas for the separation membrane. This integration of the Fischer-Tropsch process results in energy and economic savings.

The separation membrane used can be any suitable water permeable membrane which can also withstand the harsh temperatures and pressures involved in treating a Fischer-Tropsch product stream. Most preferably, the separation membrane is a ceramic membrane. Such ceramic membranes are commercially available, for example, from the CeraMem Corporation. Generally the ceramic membranes are made of dense ceramic materials comprised of a mixture of metal oxides. Such materials can withstand high temperatures (over 700° C.) and pressures. While ceramic membranes are most preferred and are believed to provide the best results, other membranes such as zeolite membranes could be used as well. Any suitable zeolite capable of selectively removing water from the product stream can be used in the zeolite membrane, e.g., mordenite, ZSM-5, zeolite A or chabazite.

The separation membrane can be of any suitable shape or configuration. It can be of a tubular shape, U-shaped, elongate form, or preferably disk form. The separation membrane can also be supported in any suitable manner.

In a most preferred embodiment, a Fischer-Tropsch overhead stream is fed to a ceramic membrane. An example of a commercially available ceramic membrane according to the present invention is one available from CeraMem Corporation. "Ceramic membrane" as used herein refers to a separation device constructed of predominately inorganic materials, which may be continuously operated at temperatures in excess of 180° C. with little or no detriment on performance. In such a membrane, only fast gases, with kinetic diameter less than or equal to those of water vapor, such as hydrogen, helium, and water vapor, readily pass through the membrane. The membrane permeate stream composition can be further restricted by using a sweep gas with a controlled hydrogen partial pressure. Accordingly, water vapor is separated from hydrocarbon synthesis products.

Specifically, a hydrogen-rich sweep gas is fed to the upstream permeate side of the ceramic membrane. The sweep gas removes water from the membrane, creating a concentration differential across the membrane. As a result, water is drawn through the membrane. Also, by using the hydrogen-rich gas on the permeate side of the membrane, the concentration differential should prefer water passing through the membrane and prevent further hydrogen and other components from passing through the membrane. Use of a hydrogen-rich sweep gas should allow for better diffusion of water through the membrane and keep hydrogen on the retentate side of the membrane.

After water vapor is separated from the hydrocarbon synthesis products using the ceramic membrane, the hydrocarbon synthesis products are separated into a tail gas fraction, a hydrocarbon condensate fraction, and reaction water. The tail gas fraction comprises $H_2$, CO, $CO_2$, and $C_{1-2}$ products, the hydrocarbon condensate fraction comprises $C_{3-20}$ products, and the reaction water possibly comprises minor amounts of impurities such as hydrocarbons, alcohols, acids, and/or oxygenates. The tail gas fraction is hydrogen-rich, and accordingly, at least a portion of the tail gas may be used as the sweep gas in the ceramic membrane and/or as a fuel supplement to be fed to the thermal oxidizer with the water vapor, as further described below.

While vaporization is typically required prior to thermal oxidation, according to the presently claimed methods, the water stream recovered from the ceramic membrane is already in a vapor phase. Accordingly, the present invention provides economic savings, as vaporization equipment is not required.

Accordingly, the water vapor recovered from the ceramic membrane is reacted in a thermal oxidizer operated at high temperatures and low pressures, wherein contaminants are oxidized and a flue gas containing water vapor, carbon dioxide, and nitrogen oxides is produced. The reaction zone of the thermal oxidizer should be maintained at a suitably high temperature for a sufficient period of time to allow the reactants to oxidize to a point that 99.99% of the reactants are converted. Ordinarily, the flue gas from a thermal oxidizer may be used to produce or superheat steam or simply exhausted to the air.

The invention will be further illustrated by reference to the Figures of the Drawing, which are intended to be non-limiting. Referring to FIG. 1, a Fischer-Tropsch overhead product 10 is fed to a ceramic membrane 100. A hydrogen-rich sweep gas 20 is fed to the downstream permeate side of the ceramic membrane 100. A gas reduced in water content 30 is recovered from the upstream retentate side of the ceramic membrane 100. The gas reduced in water content 30 is fed to a condenser 200 and a separation unit 300. At least a portion of a hydrogen-rich tail gas 40 recovered from the separation unit 300 may serve as a source of a hydrogen-rich sweep gas 20. Water vapor 50 which permeates the ceramic membrane 100 is recovered and entrained by the $H_2$-rich gas and the mixture is fed to a thermal oxidizer 400. The portion of the hydrogen-rich tail gas 40 recovered from the separation unit 300 fed with the water vapor 50 to the thermal oxidizer 400 acts as a fuel supplement for the thermal oxidizer 400. The water vapor 50 does not need to be vaporized prior to being fed to the thermal oxidizer 400. Furthermore, as water vapor 50 is separated from the gas reduced in water content 30, the condenser 200 and separation unit 300 may be smaller than if the Fischer-Tropsch overhead product 10 were fed directly to a condenser and separation unit. Accordingly, the present embodiment results in economic savings.

Figure 2:
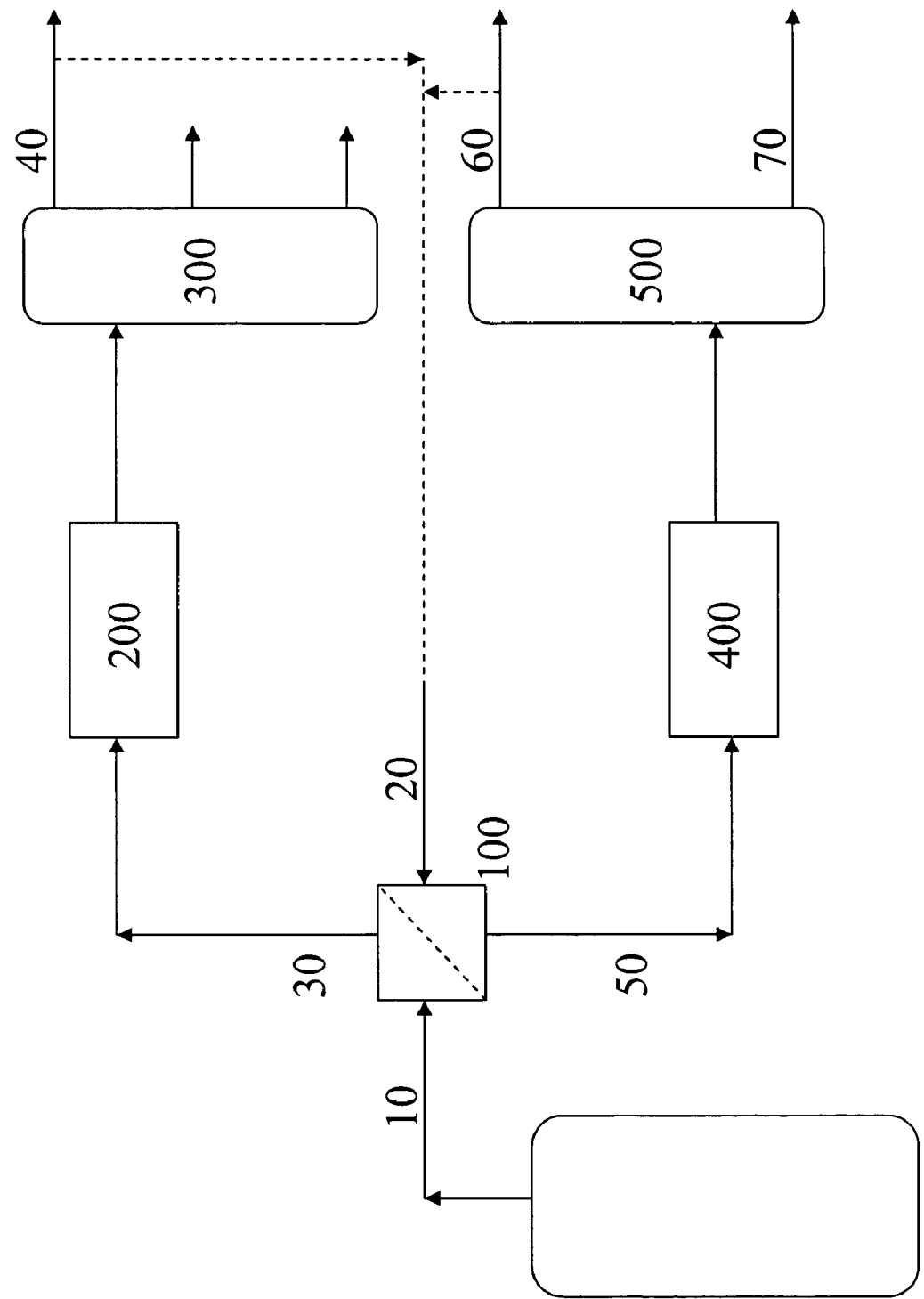
FIG. 2 illustrates an embodiment of the present invention comprising multiple separation units.

Referring to FIG. 2, a Fischer-Tropsch overhead product 10 is fed to a ceramic membrane 100. A hydrogen-rich sweep gas 20 is fed to the upstream permeate side of the ceramic membrane 100. A gas reduced in water content 30 is recovered from the downstream retentate side of the ceramic membrane 100. The gas reduced in water content 30 is fed to a condenser 200 and a separation unit 300. At least a portion of a hydrogen-rich tail gas 40 recovered from the separation unit 300 may serve as a source of the hydrogen-rich sweep gas 20. Water vapor 50 which permeates the ceramic membrane 100 is fed to a condenser 400 and a separation unit 500. A hydrogen-rich tail gas 60 and purified water 70 are recovered from the separation unit 500. At least a portion of the hydrogen-rich tail gas 60 may serve as a source of the hydrogen-rich sweep gas 20. As water vapor 50 is separated from the gas reduced in water content 30, the condenser 200 and separation unit 300 may be smaller than if the Fischer-Tropsch overhead product 10 were fed directly to a condenser and separation unit. Accordingly, the present embodiment results in economic savings.

While the devices, compositions and methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A method for separating water from a Fischer-Tropsch stream comprising:
   a) feeding the Fischer-Tropsch stream to a separation membrane having an upstream retentate side and a downstream permeate side, with the stream being fed to the upstream retentate side;
   b) recovering a retentate stream reduced in water content from the upstream retentate side of the separation membrane;
   c) recovering water from the downstream permeate side of the separation membrane;
   d) feeding the retentate stream reduced in water content to a condenser and a separation unit;
   e) recovering a hydrogen-rich gas from the separation unit; and
   f) using the hydrogen-rich gas as a hydrogen-rich sweep gas by passing the gas past the downstream permeate side of the separation membrane.

2. The method of claim 1, wherein the stream fed to the separation membrane is an overhead vapor stream, and water vapor is recovered from the downstream permeate side of the separation membrane.

3. The method of claim 1, wherein the separation membrane is a ceramic membrane.

4. The method of claim 2, further comprising feeding the water vapor recovered to a thermal oxidizer.

5. A method for separating water from a Fischer-Tropsch stream comprising:
   a) feeding the Fischer-Tropsch stream to a separation membrane having an upstream retentate side and a downstream permeate side, with the stream being fed to the upstream retentate side;
   b) recovering a retentate stream reduced in water content from the upstream retentate side of the separation membrane;
   c) recovering water vapor from the downstream permeate side of the separation membrane; and
   d) feeding a sweep gas to the downstream permeate side of the separation membrane to thereby remove the water permeate, wherein the sweep gas is a hydrogen-rich tail gas separated from a Fischer-Tropsch product stream.

6. A method for separating water from a Fischer-Tropsch stream comprising:
   a) feeding the Fischer-Tropsch stream to a separation membrane having an upstream retentate side and a downstream permeate side, with the stream being fed to the upstream retentate side;
   b) recovering a retentate stream reduced in water content from the upstream retentate side of the separation membrane;

c) recovering water from the downstream permeate side of the separation membrane;
d) feeding the water vapor to a condenser and a separation unit;
e) recovering a hydrogen-rich gas from the separation unit; and
f) using the hydrogen-rich gas as a hydrogen-rich sweep gas by passing the gas past the downstream permeate side of the separation membrane to thereby remove the water permeate.

7. A method for separating water vapor from a Fischer-Tropsch overhead product comprising:
a) feeding the Fischer-Tropsch overhead product to a ceramic membrane comprising an upstream retentate side and a downstream permeate side;
b) feeding a hydrogen-rich sweep gas to the downstream permeate side of the ceramic membrane in order to recover water vapor;
c) feeding the recovered water vapor and hydrogen-rich gas to a thermal oxidizer;
d) recovering a gas reduced in water content from the upstream retentate side of the ceramic membrane;
e) feeding the gas reduced in water content to a condenser and a separation unit;
f) recovering a hydrogen-rich gas from the separation unit; and
g) using at least a portion of the hydrogen-rich gas as the hydrogen-rich sweep gas.

* * * * *